United States Patent
Friedrichs et al.

(10) Patent No.: US 7,484,610 B2
(45) Date of Patent: Feb. 3, 2009

(54) APPARATUS FOR THE ACTUATION OF CLAMPING ELEMENTS THAT CAN BE CONTROLLED REMOTELY

(75) Inventors: Jens Friedrichs, Neckargemünd (DE); Christian Görbing, Heidelberg (DE); Karl-Heinz Helmstädter, Heidelberg (DE); Markus Möhringer, Weinheim (DE); Thomas Schmidt, Eppelheim (DE); Martin Seipel, Schriesheim (DE)

(73) Assignee: Heidelberger Druckmaschinen, Heidelberg (DE)

(*) Notice: Subject to any disclaimer, the term of this patent is extended or adjusted under 35 U.S.C. 154(b) by 430 days.

(21) Appl. No.: 11/059,000

(22) Filed: Feb. 16, 2005

(65) Prior Publication Data

US 2005/0199150 A1 Sep. 15, 2005

(30) Foreign Application Priority Data

Mar. 10, 2004 (DE) .................. 10 2004 011 620
Sep. 17, 2004 (DE) .................. 10 2004 045 098

(51) Int. Cl.
*F16D 25/06* (2006.01)
*F16D 13/22* (2006.01)

(52) U.S. Cl. .................. 192/91 A; 74/439
(58) Field of Classification Search .................. 74/439; 101/230

See application file for complete search history.

(56) References Cited

U.S. PATENT DOCUMENTS

| | | | |
|---|---|---|---|
| 4,735,140 A * | 4/1988 | Wieland et al. | 101/230 |
| 4,782,717 A | 11/1988 | Becker | |
| 5,265,528 A | 11/1993 | Mathes | |
| 5,398,606 A | 3/1995 | Becker | |
| 5,802,920 A | 9/1998 | Becker | |
| 6,003,604 A * | 12/1999 | Wilkins | 166/366 |

FOREIGN PATENT DOCUMENTS

| | | |
|---|---|---|
| DE | 83 31 906.9 U1 | 1/1984 |
| DE | 36 11 324 A1 | 10/1987 |
| DE | 41 41 817 C2 | 7/1993 |
| DE | 42 23 189 C3 | 1/1994 |
| DE | 44 47 862 C2 | 4/1996 |
| DE | 196 37 612 A1 | 5/1997 |
| DE | 197 18 140 C1 | 10/1998 |
| JP | 5-172129 A * | 7/1993 |
| JP | 10309792 A | 11/1998 |

* cited by examiner

*Primary Examiner*—Rodney H Bonck
(74) *Attorney, Agent, or Firm*—Laurence A. Greenberg LLP; Werner H. Stemer; Ralph E. Locher

(57) ABSTRACT

In an apparatus for clamping and releasing a gearwheel rim with respect to a main gearwheel that bears the gearwheel rim, a clamping apparatus includes an axially guided, displaceable clamping plate clamping the gearwheel rim between the plate and the main gearwheel. Antifatigue bolts are used for such a purpose. The bolts are expanded by an actuator for releasing the clamped gearwheel rim to an extent that cancels the clamping action.

10 Claims, 4 Drawing Sheets

APPARATUS FOR THE ACTUATION OF CLAMPING ELEMENTS THAT CAN BE CONTROLLED REMOTELY

BACKGROUND OF THE INVENTION

Field of the Invention

The invention relates to an apparatus for clamping and releasing a gearwheel rim with respect to a main gearwheel that bears the gearwheel rim, for a subsequent phase shift of the two with respect to one another.

It is known, for example, in turner devices for sheet processing machines, in particular, printing press, for the main gearwheel to be in drive contact with a part of the gearwheel train of a printing press and for the gearwheel rim to be in drive contact with the other part of the gearwheel train. A phase shift of the gearwheel trains has to be performed to change the turner device over from recto to verso printing.

German Patent DE 42 23 189 (corresponding to U.S. Pat. No. 5,398,606 to Becker) shows, for example, an apparatus for clamping a gearwheel rim that is mounted rotatably on the hub of a main gearwheel. For this purpose, fastening screws fasten a supporting plate to the hub of the main gearwheel at a distance. Radially oriented clamping elements are disposed in the distance gap that are supported on the supporting plate. Disk springs are provided to apply the clamping force and actuating cylinders are provided to release the clamping force.

SUMMARY OF THE INVENTION

It is accordingly an object of the invention to provide an apparatus for the actuation of clamping elements that can be controlled remotely that overcomes the hereinafore-mentioned disadvantages of the heretofore-known devices of this general type and that has a simple construction and a high clamping force.

With the foregoing and other objects in view, there is provided, in accordance with the invention, an apparatus for clamping a drive element between two components that are connected by bolts providing a clamping force and are disposed rotatably, including an actuator for releasing the clamping connection of the drive element, the actuator configured to displace the two components axially relative to one another counter to the clamping force of the bolts.

The advantage of the invention is a simple construction of the clamping elements and the capability to transmit high moments in a small installation space due to the high clamping forces that can be achieved by using antifatigue bolts as spring elements. Mounting the clamping plate without play in the circumferential direction makes it possible to use a second pair of friction surfaces to increase the moment transmission. To ensure the freedom from play of the clamping plate in the circumferential direction, there is provision for the mounting between the clamping plate and pressure bolts to be lined, for example, by an epoxy resin.

In accordance with another feature of the invention, the first component is a main gearwheel having a hub, the second component is a clamping plate, and the drive element is a crown gear rotatably mounted on the hub of the first component.

In accordance with a further feature of the invention, there are provided guide bolts. The clamping plate is mounted in an axially displaceable manner on the guide bolts.

In accordance with an added feature of the invention, the guide bolts are connected fixedly to the main gearwheel.

In accordance with an additional feature of the invention, the hub has an end side and there is provided an operating cylinder having an operating piston. The guide bolts have a collar for support on the end side of the hub and are brought into operative contact with the operating piston of the operating cylinder.

In accordance with yet another feature of the invention, there is provided a restoring spring disposed between the operating piston and the clamping plate.

In accordance with yet a further feature of the invention, the clamping plate has a through hole and at least one of the guide bolts is disposed without play in the through hole of the clamping plate.

In accordance with yet an added feature of the invention, the clamping plate has a central hole and the actuator is an operating cylinder having a casing mounted in the central hole of the clamping plate.

In accordance with yet an additional feature of the invention, the casing of the operating cylinder has hooks distributed over a circumference thereof and the hooks are disposed to be brought into operating contact with the clamping plate.

In accordance with again another feature of the invention, at least one of the bolts is a threaded antifatigue bolt.

In accordance with again a further feature of the invention, the antifatigue bolt has an adjustable head and is to be screwed to the main gearwheel and is to be supported on the clamping plate by the adjustable head.

To increase the resilient, elastic component of the antifatigue bolts, the expansion component is selected to be relatively great in relation to the fastening component, for example, 1:4. A further possibility lies in providing a spacer sleeve that is resilient in the axial direction between the antifatigue bolt head and the clamping plate.

In accordance with again an added feature of the invention, the clamping plate has a hole and a spacer sleeve is to be disposed in the hole of the clamping plate and supports the antifatigue bolt on the clamping plate.

In accordance with again an additional feature of the invention, there is provided a thrust rod, the casing of the operating cylinder being coupled to the thrust rod for selectively clamping and releasing an adjusting carriage.

With the objects of the invention in view, in an assembly having a rotating main gearwheel with a hub, a rotating clamping plate, bolts connecting the clamping plate to the gearwheel in a clamping connection, the bolts providing a clamping force, and a crown gear rotatably mounted on the hub and disposed between the gearwheel and the plate, there is also provided a clamping apparatus for clamping the crown gear, including an actuator releasing the clamping connection of the crown gear between the gearwheel and the plate by displacing the gearwheel and the plate axially relative to one another counter to the clamping force of the bolts.

With the objects of the invention in view, in a sheet processing printing press having a turner device with a drum, there is also provided an apparatus for clamping a drive element between two components of the press, which components are connected by bolts providing a clamping force and are disposed rotatably, the apparatus including an actuator according to the present invention for releasing a clamping connection of the drive element.

With the objects of the invention in view, in a sheet processing printing press having a turner device with a drum, the turner device having a rotating main gearwheel with a hub, a rotating clamping plate, bolts connecting the clamping plate to the gearwheel in a clamping connection, the bolts providing a clamping force, and a crown gear rotatably mounted on the hub and disposed between the gearwheel and the plate, there is also provided a clamping apparatus disposed on the drum for clamping the crown gear, the clamping apparatus having an actuator releasing the clamping connection of the crown gear between the gearwheel and the plate by displacing the gearwheel and the plate axially relative to one another counter to the clamping force of the bolts.

Other features that are considered as characteristic for the invention are set forth in the appended claims.

Although the invention is illustrated and described herein as embodied in an apparatus for the actuation of clamping elements that can be controlled remotely, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
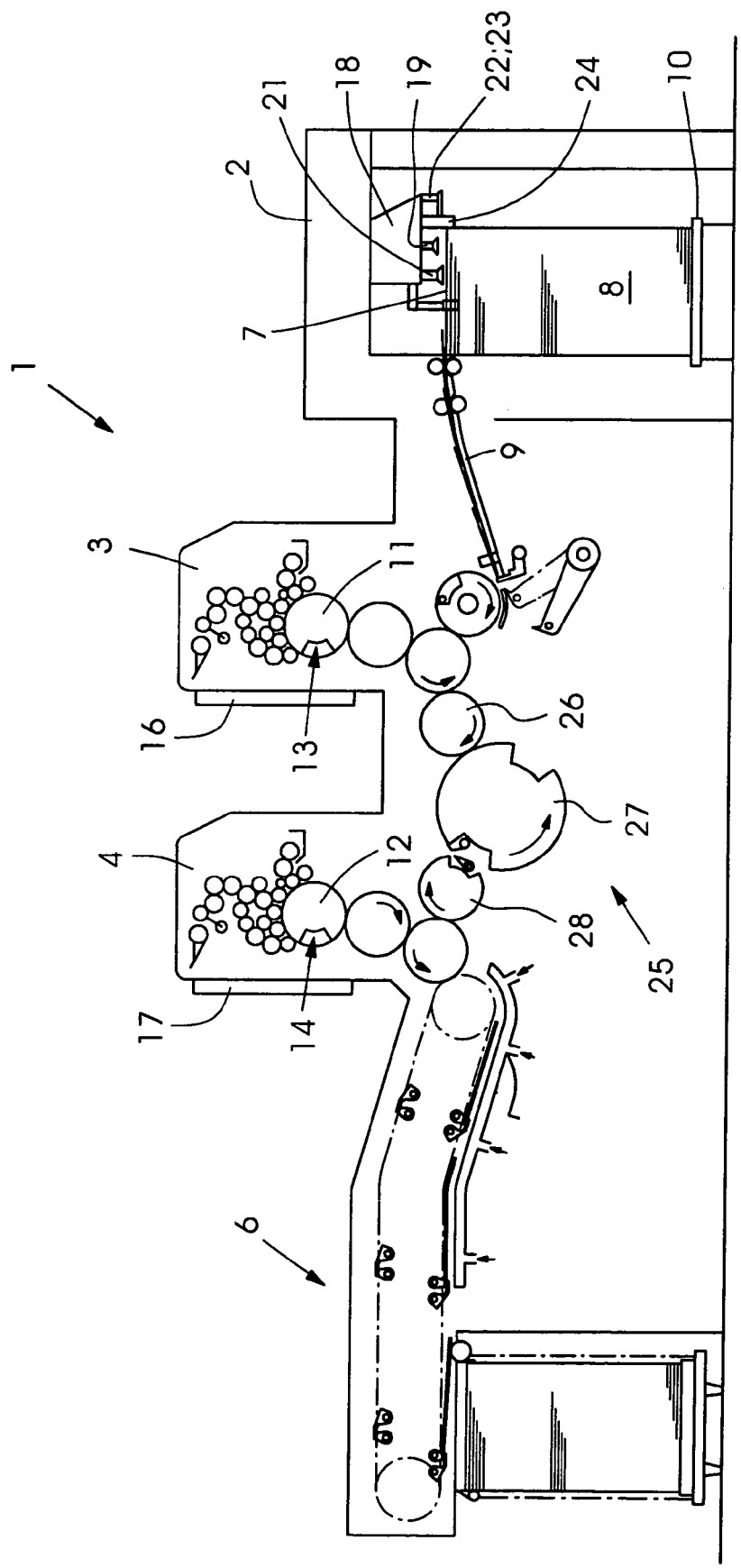
FIG. 1 is a diagrammatic cross-sectional view of a sheet fed rotary press.

Referring now to the figures of the drawings in detail and first, particularly to FIG. 1 thereof, there is shown a machine 1 that processes sheets 7, for example, a printing press, has a feeder 2, at least one printing unit 3 and/or 4 and a deliverer or delivery 6. The sheets 7 are removed from a sheet stack 8 and fed to the printing units 3 and 4 through a feed table 9 individually or overlapped. The printing units 3 and 4 each have a plate cylinder 11, 12 in a known manner. The plate cylinders 11, 12 each have an apparatus 13, 14 for fastening flexible printing plates. Moreover, each plate cylinder 11, 12 is associated with an apparatus 16, 17 for the semiautomatic or fully automatic changing of printing plates.

The sheet stack 8 lies on a stack board 10 that can be raised in a controlled manner. The sheets 7 are removed from the upper side of the sheet stack 8 by what is referred to as a suction head 18 that, inter alia, has a number of lifting and dragging suckers 19, 21 for separating the sheets 7. Moreover, the blowing devices 22 are provided for loosening the upper sheet layers, and sensing elements 23 are provided for tracking the stack. To align the sheet stack 8, in particular, the upper sheets 7 of the sheet stack 8, a number of lateral and rear stops 24 are provided.

The sheets 7 are transported through the machine, in particular, between the printing units 3, 4, by cylinders 26, 27, 28 that carry gripper devices. The gripper devices are configured as a turner device 25. The transfer cylinder 26, the storage drum 27, and the turner drum 28 are, thus, disposed behind the printing unit 3. The clamping apparatus can be disposed both on the turner drum 28 and on the storage drum 27. A configuration on the turner drum 28 is described in the exemplary embodiment of the present invention.

Figure 2:
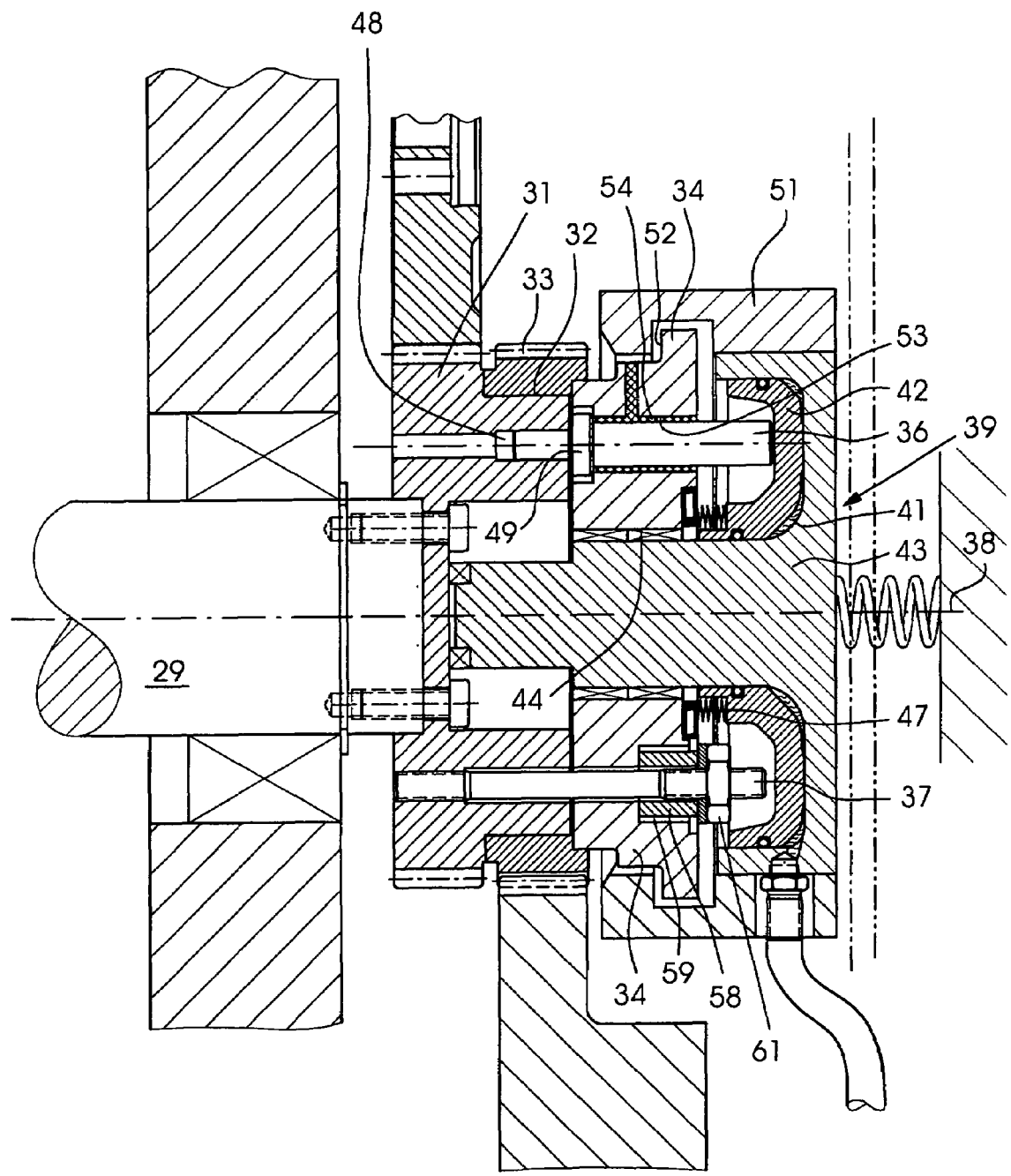
FIG. 2 is a fragmentary, cross-sectional view of a clamping device according to the invention for use in the rotary press with an antifatigue bolt coupling in a clamped operating state.
Figure 3:
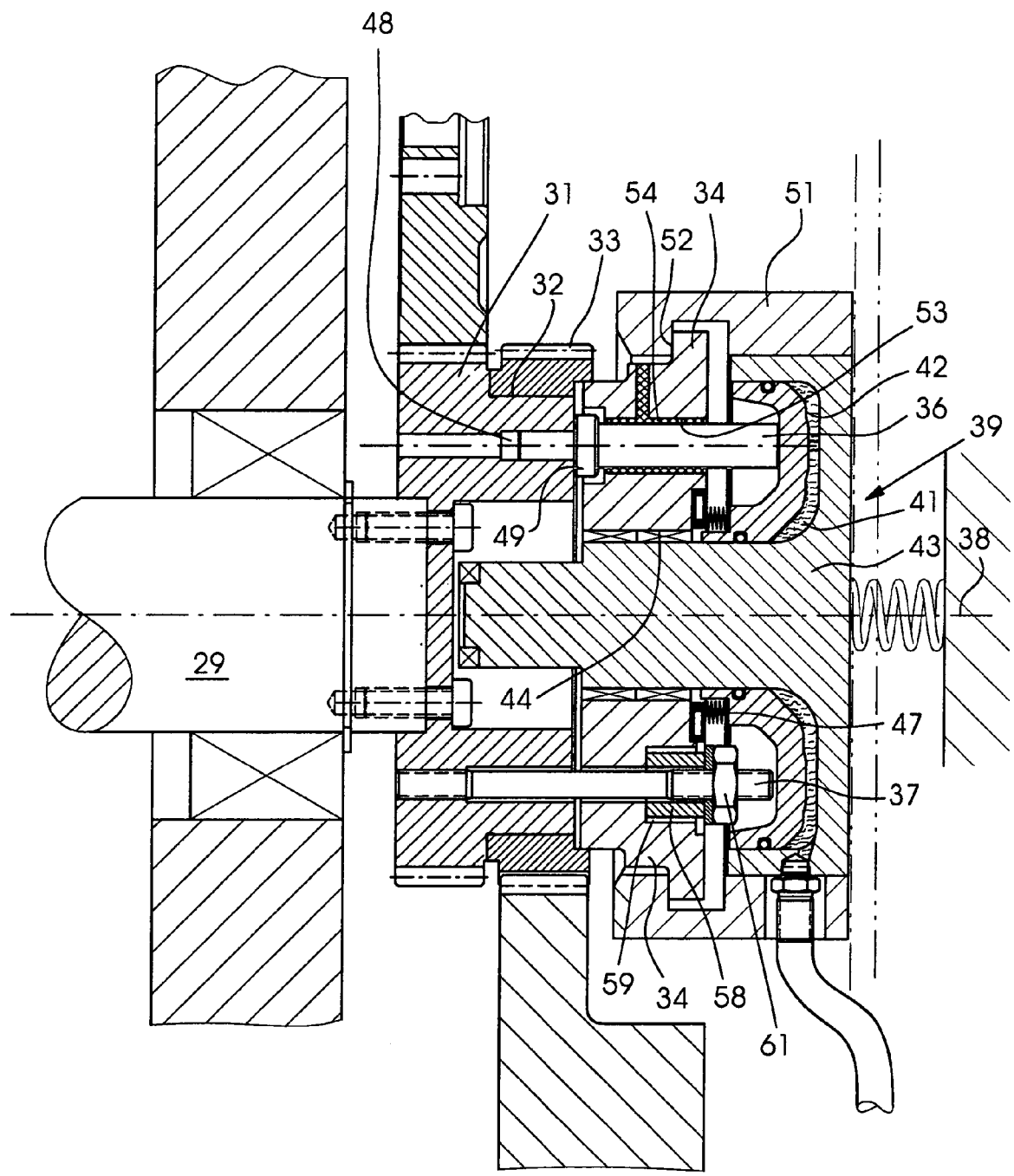
FIG. 3 is a fragmentary, cross-sectional view of the clamping device of FIG. 2 with the antifatigue bolt coupling in a released operating state.

For such a purpose, as shown in FIGS. 2 and 3, the turner drum 28 bears what is known as a double gearwheel having a main gearwheel 31 that is fastened to the bearing journal 29 of the turner drum 28 and bears a crown gear 33 that is disposed so as to be rotatable in the circumferential direction on its hub 32. An axially movable clamping plate 34 is disposed on the end side of the hub 32, which clamping plate 34 can be brought into clamping contact with the crown gear 33. The clamping plate 34 is held in a manner guided axially on guide bolts 36 and is stressed together with the main gearwheel 31 by provided antifatigue bolts 37 such that the crown gear 33 is clamped fixedly between a flank of the main gearwheel 31 and the clamping plate 34. The guide bolts 36 and the antifatigue bolts 37 are disposed alternately in a circle around the cylinder axis 38. Very great holding forces can be achieved by using the antifatigue bolts 37. As a result, the clamping apparatus is particularly suitable for long machines with, for example, more than four processing stations after the turner device 25. An operating cylinder 39 that is disposed so as not to be rotatable releases the gearwheel clamping. The cylinder 39 has an annular operating chamber 41 and an annular operating piston 42 that is disposed so as not to be rotatable. The cylinder casing 43 is mounted axially movably in a central hole 44 in the clamping plate 34.

The mounting of the cylinder casing 43 permits the clamping plate 34 to rotate with respect to the cylinder casing 43 that is disposed in a rotationally fixed manner.

To release the clamping connection of the crown gear 33 and the main gearwheel 31, the working chamber 41 has pressure applied to it and, as shown in FIG. 3, moves the annular piston 42 counter to the force of a restoring spring 47 until the annular piston 42 initially comes into contact with the annularly disposed guide bolts 36. The annular piston 42 thereupon presses axially against the guide bolts 36 that are supported on the end side of the main gearwheel 31 by a collar 49 and, thus, form an abutment for the operating cylinder 39. The cylinder casing 43 is moved axially counter to the piston movement by the operating pressure in the operating chamber 41 and, in the process, reaches behind a correspondingly configured circumferential edge 52 of the clamping plate 34 with provided hooks 51 that are disposed on its circumference and moves the clamping plate 34 along with itself counter to the clamping force of the antifatigue bolts 37.

The antifatigue bolts 37 are extended to such an extent in the process to cancel the holding force that acts on the crown gear 33. The extension of the antifatigue bolt 37 lies within the elastic spring range of the antifatigue bolt material and can, therefore, be repeated almost as desired without a permanent deformation.

The bolts 36 that serve to guide the clamping plate 34 are fitted without play into holes 48 of the main gearwheel 31. To avoid circumferential play between a bolt 36 and a through hole 53 in which the respective bolt 36 is disposed, there is provision for the intermediate space 54 between the hole 53 and the bolt 36 to be filled with a plastic, for example, epoxy resin.

To maximize the expansion component of the antifatigue bolt 37, there is provision for a diameter/length ratio of the antifatigue bolt 37 to be small. To increase the spring action of the antifatigue bolt 37, there is provision for a spacer sleeve 58 to be provided in a hole 59 of the clamping plate 34 between the adjustable head 61 (for example, nut) of the antifatigue bolt 37 and the clamping plate 34. The spring elasticity of the clamping device is increased by this measure.

The required clamping force of the coupling is set by the number of antifatigue bolts 37 and their elasticity.

Figure 4:
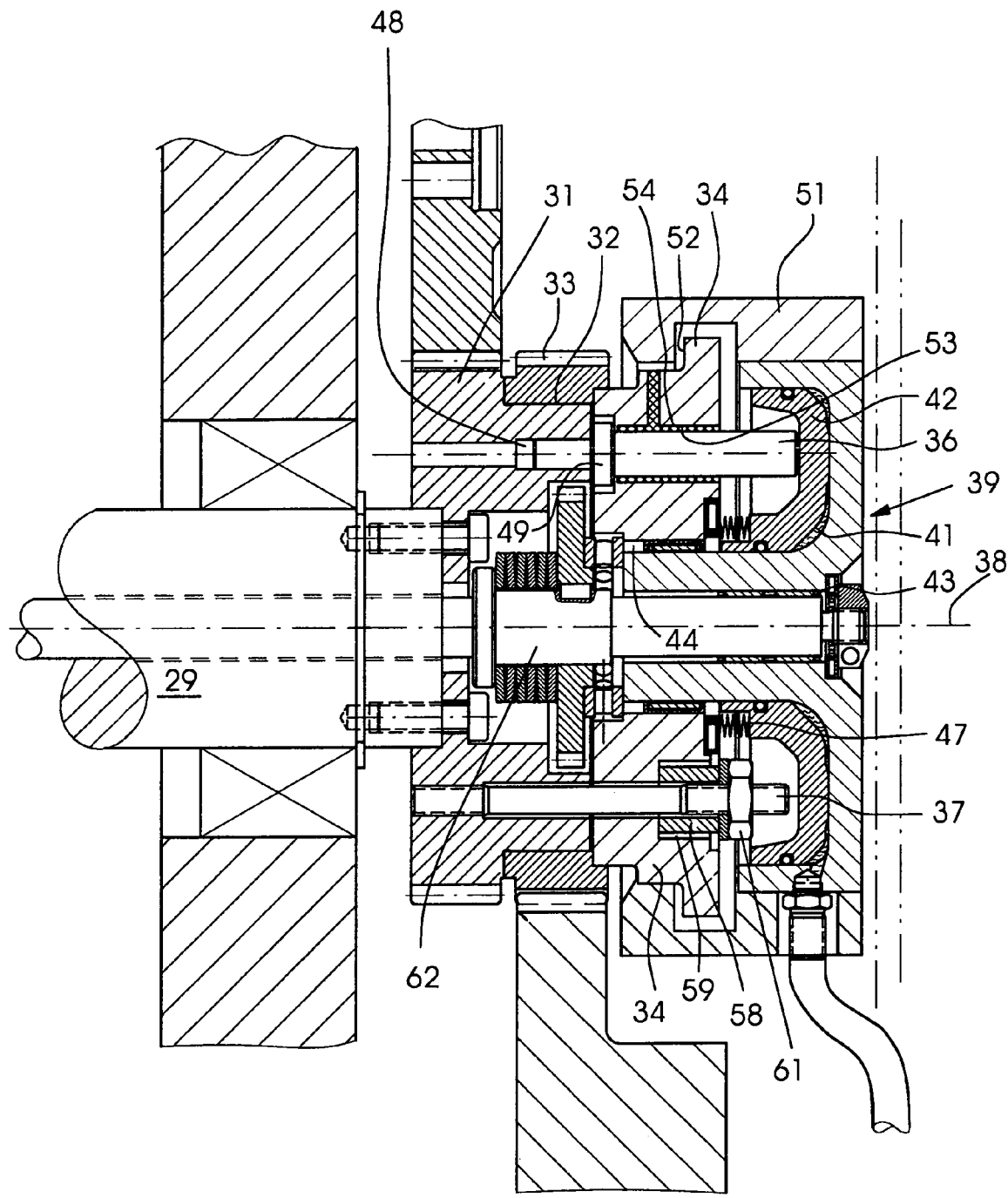
FIG. 4 is a fragmentary, cross-sectional view of an alternative embodiment of the clamping device of FIGS. 2 and 3.

In a preferred exemplary embodiment according to FIG. 4, there is provision for a switching movement of the operating cylinder 39, in particular, the axial movement of the casing 43, to be used to release a clamping action on an adjusting carriage through a thrust rod 62, as is disclosed, for example, from German Patent DE 42 23 189 C3 (corresponding to U.S. Pat. No. 5,398,606 to Becker). The thrust rod 62 is rotatably mounted with respect to the casing 43 that is disposed so as not to be rotatable, but is coupled in an axially displaceable manner to the casing 43.

This application claims the priorities, under 35 U.S.C. § 119, of German Patent Application No. 10 2004 011 620.2 filed Mar. 10, 2004, and German Patent Application 10 2004 045 098.6 filed Sep. 17, 2004; the entire disclosure of the prior applications are herewith incorporated by reference.

We claim:

1. A clamping apparatus comprising:
   a first component being a rotating main gearwheel having a hub;
   a second component being a rotating clamping plate having through holes formed therein;
   a drive element being a crown gear rotatably mounted on said hub of said first component;
   anti-fatigue bolts connecting said first component and said second component, said bolts providing a clamping force for clamping said drive element between said first component and said second component in a clamping connection;
   guide bolts, said clamping plate being mounted in an axially displaceable manner on said guide bolts via said through holes;
   an intermediate space between said holes and said guide bolts;
   an epoxy resin filling said intermediate space such that said guide bolts mount said clamping plate without play in a circumferential direction;
   an actuator for releasing said clamping connection of said drive element, said actuator being configured to displace said first and second components axially relative to one another from a clamped operating state to a released operating state counter to the clamping force of said anti-fatigue bolts, said anti-fatigue bolts being configured to elastically deform by an amount substantially equal to a displacement between said clamped operating state and said released operating state.

2. The apparatus according to claim 1, wherein said guide bolts are connected fixedly to said main gearwheel.

3. The apparatus according to claim 2, wherein the hub has an end side and further comprising:
   an operating cylinder having an operating piston; and
   said guide bolts having a collar for support on the end side of the hub and being brought into operative contact with said operating piston of said operating cylinder.

4. The apparatus according to claim 3, further comprising a restoring spring disposed between said operating piston and said clamping plate.

5. The apparatus according to claim 2, wherein:
   said clamping plate has a through hole; and
   at least one of said guide bolts is disposed without play in said through hole of said clamping plate.

6. The apparatus according to claim 1, wherein:
   said clamping plate has a central hole; and
   said actuator is an operating cylinder having a casing mounted in said central hole of said clamping plate.

7. The apparatus according to claim 6, wherein:
   said casing of said operating cylinder has hooks distributed over a circumference thereof; and
   said hooks are disposed to be brought into operating contact with said clamping plate.

8. The apparatus according to claim 6, further comprising, a thrust rod, said casing of said operating cylinder being coupled to said thrust rod for selectively clamping and releasing an adjusting carriage.

9. The apparatus according to claim 1, wherein said anti-fatigue bolts have an adjustable head and are to be screwed to said main gearwheel and are to be supported on said clamping plate by said adjustable head.

10. The apparatus according to claim 9, wherein:
    said clamping plate has a hole; and
    a spacer sleeve is to be disposed in said hole of said clamping plate and supports said antifatigue bolt on said clamping plate.

* * * * *